Oct. 29, 1957     P. A. RAICHE     2,810,928
DIPPING DEVICE FOR A FOUNTAIN SYRINGE BAG
Original Filed Dec. 18, 1952     2 Sheets-Sheet 1
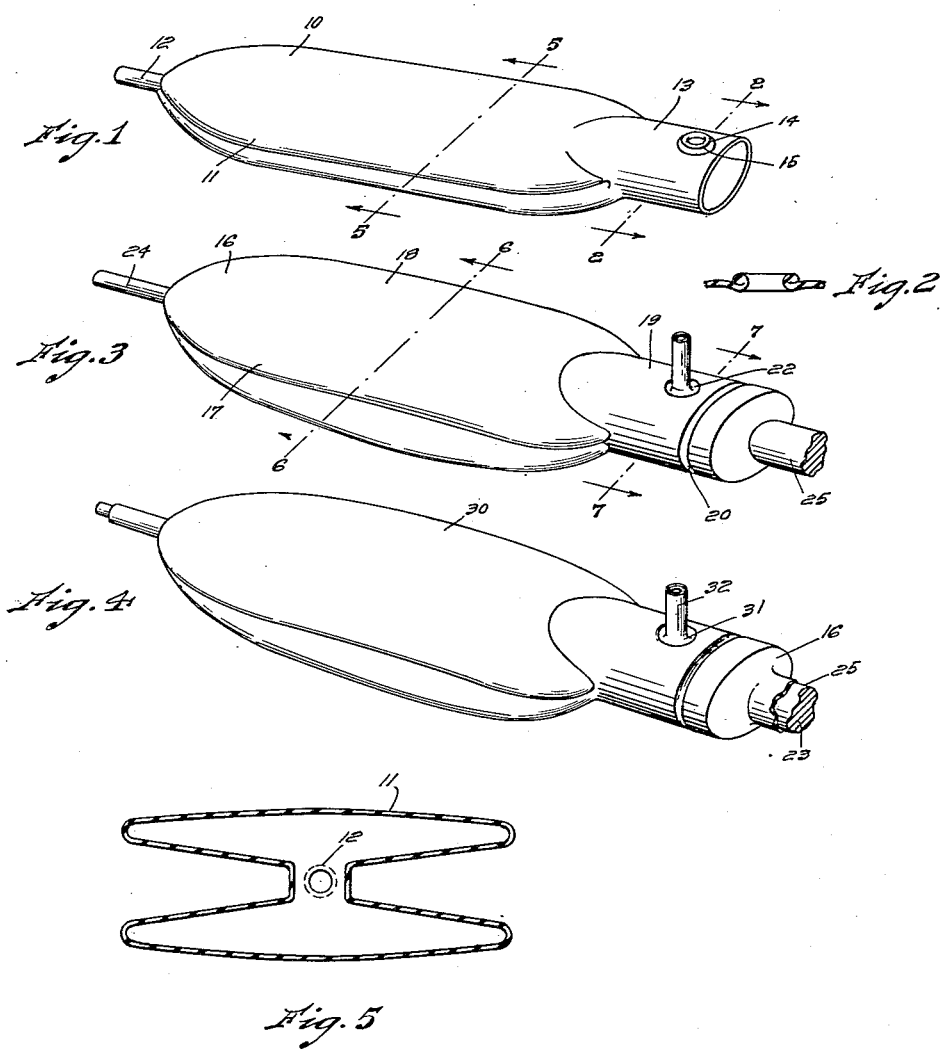
INVENTOR.
Paul A. Raiche
BY Elliot A. Salter
Attorney

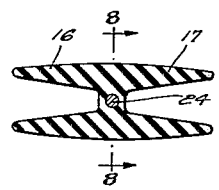
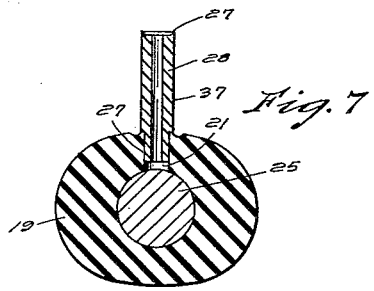
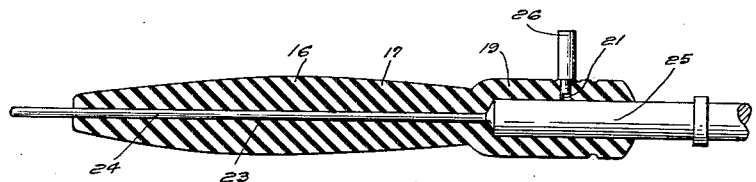
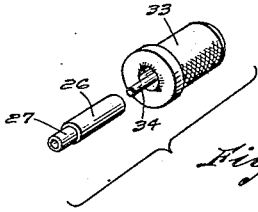
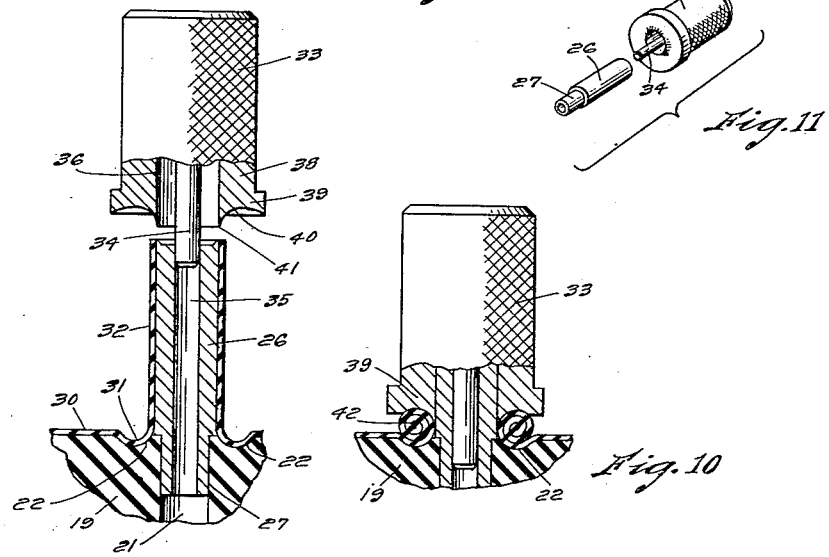

United States Patent Office 2,810,928
Patented Oct. 29, 1957

2,810,928

DIPPING DEVICE FOR A FOUNTAIN SYRINGE BAG

Paul A. Raiche, North Providence, R. I., assignor to Davol Rubber Company, a corporation of Rhode Island Original application December 18, 1952, Serial No. 326,662, now Patent No. 2,709,279, dated May 31, 1955. Divided and this application September 24, 1954, Serial No. 460,209

3 Claims. (Cl. 18—5)

This application is a division of application Serial No. 326,662, filed December 18, 1952, now Patent No. 2,709,279 for Fountain Syringe Bag.

The present invention relates to fountain syringes, and has particular reference to a novel construction for a flexible fountain syringe bag.

The principal object of the invention is to provide a dipping device for the manufacture of a dipped latex fountain syringe bag having an integral grommet.

With the above and other objects and advantageous features in view, the invention consists of a novel article more fully disclosed in the detailed description following, in conjunction with the accompanying drawings, and more specifically defined in the claims appended thereto.

In the drawings,

Fig. 1 is a perspective view of an illustrative fountain syringe bag;

Fig. 2 is an enlarged section on the line 2—2 of Fig. 1;

Fig. 3 is a perspective view of the former parts for the manufacture of the bag of Fig. 1;

Fig. 4 is a view of the former parts of Fig. 2 after dipping in latex or other rubber solution;

Fig. 5 is an enlarged section on the line 5—5 of Fig. 1;

Fig. 6 is a section on the line 6—6 of Fig. 3;

Fig. 7 is an enlarged section on the line 7—7 of Fig. 2;

Fig. 8 is a section on the line 8—8 of Fig. 6;

Fig. 9 is an enlarged view of the parts of Fig. 7 after dipping, with the grommet curling tool in position for curling the grommet;

Fig. 10 is a view similar to Fig. 9, the parts being shown at the completion of the grommet curling operation; and Fig. 11 is a perspective exploded view of the grommet tool parts.

It has been found desirable to provide a fountain syringe bag with an integral grommet of sufficient strength to support the bag, when filled, on a nail or other suitable holder. Such grommets have hitherto been made separately, of metal or the like, and mounted at the mouth of the bag, or have been made as part of a band cemented or otherwise secured to the mouth of the bag, thus providing a relatively weak construction at a relatively high manufacturing cost.

I have found it feasible to manufacture a fountain syringe bag with an integral grommet by dipping a bag form equipped with a detachable grommet forming cylinder, in latex or other suitable rubber or rubber substitute solution, to provide the bag with an upstanding tube which is then curled down to provide a curled laminated grommet bead of substantial size and strength, the subsequent finishing operation such as curing integrating the parts together.

Referring to the drawings, the fountain syringe bag 10 includes the usual expansible bag portion 11, an outflow tube 12, and a cylindrical filling mouth portion 13, the mouth portion 13 having an integral grommet 14 in the form of a heavy annular bead 15, the bag being made of latex or other suitable natural or synthetic rubber, or of suitable plastic, if desired.

The bag is preferably manufactured by dipping a form 16, see Fig. 3, into latex solution. The form 16 is made of suitable material, preferably heavy rubber, with a body portion 17 of generally H-shape, see Fig. 5, having its surfaces roughened with knurlings indicated by the reference numeral 18, and a mouth section 19 provided with an annular upper groove 20 and a grommet opening 21, see Fig. 7, the surface at the grommet opening 21 having an annular arcuate encircling recess 22. A removable elongated metal rod 23 extends through the form 16, with a lower portion 24 of narrow diameter which protrudes from the form as shown in Fig. 8, and a wider upper portion 25 which seats in the mouth section 19; a removable tubular metal plug 26, see Fig. 7, has a reduced lower end 27 to seat in the grommet opening 21, and has its upper end 28 recessed to provide a sharp annular edge 29.

Referring now to Figs. 4 and 9, the form 16, with its rod 23 and its metal plug 26 in place, is dipped in successively rubber solution and in coagulant solution in the usual manner to provide a coating 30 extending over the form and including a coating portion 31 extending into the annular recess 22 and a cylindrical coating portion 32 around the metal plug 26. A rolling tool 33 is now mounted on the metal plug 26, having a central depending pin 34 adapted to slide enter the bore 35 of the metal plug 26, a cylindrical recess 36 adapted to slide engage the outer surface 37 of the metal plug 26, and an outer cylindrical body 38 which has its lower end 39 of increased diameter and recessed and curved as indicated at 40 to provide a sharp annular edge 41 which strips the cylindrical coating portion 32 and rolls it down into the annular recess 22; the outer surface of the body 38 is preferably knurled as illustrated to facilitate the down thrust. The cylindrical coating portion 32 is thus rolled into a tight annular bead or ring 42, see Fig. 10, and a sturdy grommet results.

The coating and its annular ring are now cured, preferably by air-curling, and stripped from the form, whereby a one-piece flexible bag with an integral grommet results, the inner surfaces of the flexible bag being knurled to prevent contacting adhesion.

Although I have disclosed a specific method of manufacture and a specific fountain syringe by construction, it is obvious that the method of manufacture may be applied to other dipped rubber and rubber substitute articles, and that the size, shape, and arrangement of the bag parts may be varied for different bag uses, without departing from the spirit and the scope of the invention as defined in the appended claims.

I claim:

1. A dipping form for a fountain syringe bag, having a body portion and a mouth portion, said mouth portion having a grommet opening, a cylindrical metal plug removably seated in said grommet opening, and a rolling tool removably slidable on said metal plug and having its lower surface recessed to engage a coating on the plug and roll it down towards the body portion.

2. A dipping form for a fountain syringe bag, having a body portion and a mouth portion, said mouth portion having a grommet opening, a cylindrical metal plug removably seated in said grommet opening, and a rolling tool removably slidable on said metal plug and having its lower surface recessed and provided with an annular edge to contact the outer surface of the metal plug and engage a coating on the plug and roll it down towards the body portion.

3. A dipping form for a fountain syringe bag, having a body portion and a mouth portion, said mouth portion having a grommet opening with an encircling annular recess, a cylindrical metal plug removably seated in said grommet opening, and a rolling tool removably slidable on said metal plug and having its lower surface recessed to engage a coating on the plug and roll it down towards the body portion and into the annular recess.

References Cited in the file of this patent

UNITED STATES PATENTS

| | | |
|---|---|---|
| 2,132,096 | Brueggeman | Oct. 4, 1938 |
| 2,169,475 | Spanel | Aug. 15, 1939 |
| 2,568,129 | Morris | Sept. 18, 1951 |